(12) United States Patent
Levesque et al.

(10) Patent No.: US 10,388,119 B2
(45) Date of Patent: Aug. 20, 2019

(54) EXTERNALLY-ACTIVATED HAPTIC DEVICES AND SYSTEMS

(71) Applicant: Immersion Corporation, San Jose, CA (US)

(72) Inventors: Vincent Levesque, Montreal (CA); David M. Birnbaum, Oakland, CA (US); Benoit Belley, San Jose, CA (US); Jamal Saboune, Montreal (CA); Vahid Khoshkava, Montreal (CA); Simon Forest, Montreal (CA); Juan Manuel Cruz-Hernandez, Montreal (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/905,231

(22) Filed: Feb. 26, 2018

(65) Prior Publication Data

US 2018/0350201 A1    Dec. 6, 2018

Related U.S. Application Data

(63) Continuation of application No. 14/984,434, filed on Dec. 30, 2015, now Pat. No. 9,928,696.

(51) Int. Cl.
*G06F 3/01*    (2006.01)
*G06K 7/10*    (2006.01)
(Continued)

(52) U.S. Cl.
CPC ............... *G07G 1/01* (2013.01); *G06F 3/016* (2013.01); *G06K 7/10415* (2013.01);
(Continued)

(58) Field of Classification Search
None
See application file for complete search history.

(56) References Cited

U.S. PATENT DOCUMENTS 5,812,065 A * 9/1998 Schrott ................. G01S 13/753
                                                       235/380
5,920,261 A    7/1999 Hughes et al.
(Continued)

FOREIGN PATENT DOCUMENTS

CN    101485559    7/2009
CN    102741788    10/2012
(Continued)

OTHER PUBLICATIONS

U.S. Appl. No. 14/297,012 , "Advisory Action", dated Sep. 16, 2016, 3 pages.
(Continued)

*Primary Examiner* — Fekadeselassie Girma
(74) *Attorney, Agent, or Firm* — Kilpatrick Townsend and Stockton LLP (57) ABSTRACT

Examples of externally-activated devices and systems are disclosed. One example system includes a first device having an actuation component; and a second device having a haptic output component, wherein: the first device and the second device are configured to be physically separable from each other; the actuation component is configured to transmit an actuation signal to the haptic output component while the first device and the second device are physically separated from each other, and the haptic output component configured to output a haptic effect in response to receiving the actuation signal and while the first device and the second device are physically separated from each other, the haptic effect based on the actuation signal.

20 Claims, 5 Drawing Sheets

(51) Int. Cl.
*G07F 7/08* (2006.01)
*G07G 1/00* (2006.01)
*G07G 1/01* (2006.01)
*H04W 4/02* (2018.01)
*H04W 4/80* (2018.01)
*G06K 19/07* (2006.01)
*G06Q 20/34* (2012.01)
*H04M 1/725* (2006.01)

(52) U.S. Cl.
CPC ....... *G06K 19/0723* (2013.01); *G06Q 20/352* (2013.01); *G07F 7/0833* (2013.01); *H04M 1/7253* (2013.01); *H04W 4/80* (2018.02); *G07G 1/009* (2013.01); *H04M 2250/04* (2013.01); *H04W 4/023* (2013.01)

(56) References Cited

U.S. PATENT DOCUMENTS

| | | | |
|---|---|---|---|
| 5,963,144 | A | 10/1999 | Kruest et al. |
| 6,084,513 | A | 7/2000 | Stoffer |
| 6,089,453 | A | 7/2000 | Kayser et al. |
| 6,337,678 | B1 | 1/2002 | Fish et al. |
| 6,506,605 | B1 | 1/2003 | Allen |
| 6,819,312 | B2 | 11/2004 | Fish |
| 7,098,792 | B1 | 8/2006 | Ahlf et al. |
| 7,123,129 | B1* | 10/2006 | Schrott ............. G06K 19/0723 340/10.1 |
| RE42,064 | E | 1/2011 | Fish et al. |
| 8,031,172 | B2 | 10/2011 | Kruse et al. |
| 8,222,996 | B2 | 7/2012 | Smith et al. |
| 8,608,080 | B2 | 12/2013 | Finn |
| 8,754,748 | B2 | 6/2014 | Orlassino |
| 9,063,572 | B2 | 6/2015 | Makinen et al. |
| 9,396,425 | B1* | 7/2016 | Schattmaier ............. G08B 6/00 |
| 10,109,169 | B2* | 10/2018 | Chevalier ................ B25H 3/02 |
| 2002/0123325 | A1* | 9/2002 | Cooper .............. H04L 63/0492 455/411 |
| 2003/0105662 | A1 | 6/2003 | Koketsu et al. |
| 2003/0197612 | A1 | 10/2003 | Tanaka et al. |
| 2004/0148117 | A1 | 7/2004 | Kirshenbaum et al. |
| 2005/0012599 | A1 | 1/2005 | DeMatteo |
| 2005/0234778 | A1 | 10/2005 | Sperduti et al. |
| 2005/0248438 | A1* | 11/2005 | Hughes .............. G06K 19/0717 340/10.4 |
| 2006/0054680 | A1 | 3/2006 | Feldman et al. |
| 2006/0071925 | A1 | 4/2006 | Wykoff et al. |
| 2006/0132302 | A1 | 6/2006 | Stilp |
| 2006/0143645 | A1 | 6/2006 | Vock |
| 2006/0244592 | A1 | 11/2006 | Kansala et al. |
| 2006/0252366 | A1 | 11/2006 | Eu |
| 2006/0261946 | A1* | 11/2006 | Himberger ......... G06K 19/0717 340/572.1 |
| 2006/0286972 | A1 | 12/2006 | Kates et al. |
| 2007/0080806 | A1 | 4/2007 | Lax et al. |
| 2007/0096880 | A1 | 5/2007 | Nagai |
| 2007/0152829 | A1 | 7/2007 | Lindsay et al. |
| 2007/0273534 | A1 | 11/2007 | Mcginn et al. |
| 2007/0276944 | A1 | 11/2007 | Samovar et al. |
| 2008/0021307 | A1* | 1/2008 | Freeman ................ A61L 2/081 600/424 |
| 2008/0093357 | A1 | 4/2008 | Norman et al. |
| 2008/0109309 | A1* | 5/2008 | Landau .............. G06Q 30/0267 705/14.64 |
| 2008/0111675 | A1 | 5/2008 | Tuttle |
| 2008/0218488 | A1 | 9/2008 | Yang et al. |
| 2008/0248836 | A1 | 10/2008 | Caine et al. |
| 2008/0303670 | A1 | 12/2008 | Seidel |
| 2009/0079550 | A1 | 3/2009 | Makinen et al. |
| 2009/0096632 | A1 | 4/2009 | Ullrich et al. |
| 2009/0102661 | A1 | 4/2009 | Barnes et al. |
| 2009/0132093 | A1 | 5/2009 | Arneson et al. |
| 2009/0138636 | A1 | 5/2009 | Burton et al. |
| 2009/0159663 | A1 | 6/2009 | Mullen et al. |
| 2009/0163322 | A1 | 6/2009 | Andren et al. |
| 2009/0243832 | A1 | 10/2009 | Hyde et al. |
| 2009/0270045 | A1 | 10/2009 | Flaherty et al. |
| 2009/0281419 | A1 | 11/2009 | Troesken et al. |
| 2010/0052908 | A1 | 3/2010 | Doan et al. |
| 2010/0052909 | A1 | 3/2010 | Doan et al. |
| 2010/0141407 | A1 | 6/2010 | Heubel et al. |
| 2010/0171715 | A1 | 7/2010 | Peterson et al. |
| 2010/0225444 | A1 | 9/2010 | Nobutsugu et al. |
| 2010/0308964 | A1 | 12/2010 | Ackley et al. |
| 2011/0049247 | A1 | 3/2011 | Black et al. |
| 2011/0050427 | A1 | 3/2011 | Skjellerup |
| 2011/0051360 | A1 | 3/2011 | Dabov et al. |
| 2011/0057770 | A1 | 3/2011 | Tsudik et al. |
| 2011/0057799 | A1 | 3/2011 | Taneff |
| 2011/0068894 | A1 | 3/2011 | Braun |
| 2011/0069229 | A1* | 3/2011 | Lord ........................ H04N 5/77 348/461 |
| 2011/0070834 | A1* | 3/2011 | Griffin ................ G06K 7/0008 455/41.1 |
| 2011/0109588 | A1 | 5/2011 | Makinen et al. |
| 2011/0169657 | A1 | 7/2011 | August et al. |
| 2011/0175708 | A1* | 7/2011 | Chaffey ............. G06K 19/0672 340/10.1 |
| 2011/0205201 | A1 | 8/2011 | Lorkowski et al. |
| 2011/0234379 | A1 | 9/2011 | Lee |
| 2011/0285667 | A1 | 11/2011 | Poupyrev et al. |
| 2011/0289023 | A1 | 11/2011 | Forster et al. |
| 2012/0056002 | A1 | 3/2012 | Ritamaki et al. |
| 2012/0062371 | A1 | 3/2012 | Radivojevic et al. |
| 2012/0062382 | A1 | 3/2012 | Taneff |
| 2012/0075139 | A1* | 3/2012 | Gagnon ................ G01S 5/0027 342/357.29 |
| 2012/0086550 | A1 | 4/2012 | Leblanc et al. |
| 2012/0109083 | A1 | 5/2012 | Coulthard et al. |
| 2012/0112902 | A1* | 5/2012 | Meyers .............. G08B 13/1436 340/539.1 |
| 2012/0217313 | A1* | 8/2012 | Bowman ............ G06K 19/0707 235/492 |
| 2012/0229401 | A1 | 9/2012 | Birnbaum et al. |
| 2012/0242798 | A1* | 9/2012 | Mcardle ........... H04N 21/23412 348/46 |
| 2012/0253594 | A1 | 10/2012 | Schreiber |
| 2012/0260728 | A1* | 10/2012 | Bhattacharyya ...... G01F 23/261 73/290 V |
| 2012/0287068 | A1 | 11/2012 | Colgate et al. |
| 2012/0327006 | A1 | 12/2012 | Israr et al. |
| 2013/0030725 | A1* | 1/2013 | Friedlander ............. G01H 1/12 702/56 |
| 2013/0135223 | A1 | 5/2013 | Shai et al. |
| 2013/0162398 | A1* | 6/2013 | Stoick ................ G08B 21/0202 340/7.58 |
| 2013/0164543 | A1 | 6/2013 | Shibuya et al. |
| 2013/0225434 | A1 | 8/2013 | Kay et al. |
| 2013/0228623 | A1 | 9/2013 | Virella |
| 2013/0248226 | A1 | 9/2013 | Sime et al. |
| 2013/0277529 | A1 | 10/2013 | Bolliger |
| 2014/0052392 | A1* | 2/2014 | Bernstein ............. G01R 31/048 702/58 |
| 2014/0077953 | A1 | 3/2014 | Yang |
| 2014/0115493 | A1 | 4/2014 | Kim et al. |
| 2014/0333417 | A1 | 11/2014 | Sun et al. |
| 2014/0375428 | A1* | 12/2014 | Park ................... G06K 7/10237 340/10.1 |
| 2015/0061833 | A1 | 3/2015 | Do et al. |
| 2015/0070150 | A1 | 3/2015 | Levesque et al. |
| 2015/0116296 | A1 | 4/2015 | Greene |
| 2015/0123775 | A1 | 5/2015 | Kerdemelidis |
| 2015/0145656 | A1 | 5/2015 | Weddle et al. |
| 2015/0189403 | A1 | 7/2015 | Magi |
| 2015/0195890 | A1 | 7/2015 | Forgey |
| 2015/0199955 | A1 | 7/2015 | Draganic |
| 2015/0250140 | A1 | 9/2015 | Fraser et al. |
| 2015/0324745 | A1* | 11/2015 | Goodall ........... G06Q 10/08355 705/337 |
| 2015/0355710 | A1 | 12/2015 | Modarres et al. |
| 2016/0019762 | A1 | 1/2016 | Levesque et al. |

(56) References Cited

U.S. PATENT DOCUMENTS

| | | | | |
|---|---|---|---|---|
| 2016/0019954 | A1* | 1/2016 | Vaskivskyi | G11C 13/0002 365/163 |
| 2016/0034724 | A1 | 2/2016 | Zumsteg | |
| 2016/0055447 | A1* | 2/2016 | Sehmer | G06Q 10/087 235/385 |
| 2016/0102483 | A1 | 4/2016 | Luo | |
| 2016/0189492 | A1* | 6/2016 | Hamam | G06F 3/016 340/407.1 |
| 2016/0328585 | A1* | 11/2016 | Stewart | G06K 19/0723 |
| 2017/0038262 | A1* | 2/2017 | Lane | G01K 1/024 |
| 2017/0075139 | A1 | 3/2017 | Sessner et al. | |
| 2017/0080826 | A1* | 3/2017 | Bonk | B60N 2/06 |
| 2017/0193760 | A1 | 7/2017 | Levesque et al. | |
| 2017/0206497 | A1* | 7/2017 | Kriss | G01G 19/414 |
| 2017/0235919 | A1* | 8/2017 | Bauss | G06F 19/3462 705/2 |
| 2017/0242980 | A1* | 8/2017 | Barrington | G16H 10/20 |
| 2017/0262845 | A1 | 9/2017 | Eisen | |
| 2017/0357833 | A1* | 12/2017 | DeBates | G06K 19/07345 |

FOREIGN PATENT DOCUMENTS

| | | |
|---|---|---|
| CN | 105278675 A | 1/2016 |
| CN | 107066083 A | 8/2017 |
| EP | 2953006 A1 | 12/2015 |
| EP | 3187975 | 7/2017 |
| JP | 2013511082 | 3/2013 |
| JP | 2017123164 A | 7/2017 |

OTHER PUBLICATIONS

U.S. Appl. No. 14/297,012, "Advisory Action", dated Jul. 12, 2017, 5 pages.
U.S. Appl. No. 14/297,012, "Final Office Action", dated May 16, 2016, 13 pages.
U.S. Appl. No. 14/297,012, "Final Office Action", dated Apr. 7, 2017, 17 pages.
U.S. Appl. No. 14/297,012, "Non-Final Office Action", dated Aug. 26, 2015, 11 pages.
U.S. Appl. No. 14/297,012, "Non-Final Office Action", dated Nov. 28, 2016, 17 pages.
U.S. Appl. No. 14/297,012, "Non-Final Office Action", dated Nov. 24, 2017, 18 pages.
U.S. Appl. No. 14/297,012, "Response to Final Office Action", dated Sep. 7, 2016, 13 pages.
U.S. Appl. No. 14/297,012, "Response to Non-Final Office Action", dated Dec. 21, 2015, 9 pages.
U.S. Appl. No. 14/322,701, "Final Office Action", dated Mar. 21, 2016, 12 pages.
U.S. Appl. No. 14/984,434, "Final Office Action", dated Mar. 8, 2017, 22 pages.
U.S. Appl. No. 14/984,434, "Non-Final Office Action", dated Nov. 23, 2016, 13 pages.
U.S. Appl. No. 14/984,434, "Non-Final Office Action", dated Jul. 6, 2017, 20 pages.
Burgo et al., "Friction Coefficient Dependence on Electrostatic Tribocharging", Scientific Reports vol. 3, No. 2384, Aug. 12, 2013, 8 pages.
EP 15169837.0, "European Search Report", dated Apr. 25, 2016, 5 pages.
EP 15169837.0, "Office Action", dated Jan. 3, 2018, 5 pages.
EP 16207392.8, "Extended European Search Report", dated Apr. 18, 2017, 11 pages.
Lee et al., "A Haptic Touchscreen Interface for Mobile Devices", ICMI '13 Proceedings of the 15th ACM on International Conference on Multimodal Interaction, Dec. 9-13, 2013, pp. 311-312.
Nakamura et al., "Multi-Finger Surface Visuo-Haptic Rendering Using Electrostatic Stimulation with Force-Direction Sensing Gloves", Department of Precision Engineering, The University of Tokyo, Hongo 7-3-1, Banky-ku, Tokyo 113-8656, Japan, IEEE Haptics Symposium, Feb. 23-24, 2014, Houston, TX, pp. 489-491.
Vitushinsky et al., "Bistable Thin-Film Shape Memory Actuators for Applications in Tactile Displays", Journal of Microelectromechanical Systems IEEE Service Center, vol. 18, No. 1, Feb. 2009, pp. 186-194.
U.S. Appl. No. 16/016,837, "Non-Final Office Action", dated Sep. 24, 2018, 13 page.
EP 15169837.0, "Office Action", dated Jul. 17, 2018, 4 pages.
EP 16207392.8, "Office Action", dated Aug. 10, 2018, 8 pages.
CN201510303182.4, "Office Action", dated Oct. 29, 2018, 27 pages.
JP2015-113625, "Office Action", dated Jan. 15, 2019, 3 pages.
Yamamoto, "Electrostatic Cutaneous Sensation Display Using Frictional Force Control", Society of Instrument and Control Engineers collected papers, Japan, Society of Instrument and Control Engineers, vol. 40, No. 11, 2004, pp. 1132-1139.
U.S. Appl. No. 16/016,837, "Final Office Action," dated Mar. 8, 2019, 15 pages.
CN 201510303182.4, "Office Action," dated Mar. 26, 2019, 24 pages.

\* cited by examiner

EXTERNALLY-ACTIVATED HAPTIC DEVICES AND SYSTEMS

CROSS-REFERENCE TO RELATED APPLICATIONS

This application is a continuation of co-pending U.S. patent application Ser. No. 14/984,434, filed Dec. 30, 2015, entitled "Externally-Activated Haptic Devices and Systems," which is hereby expressly incorporated by reference in their entirety for all purposes.

FIELD

The present application generally relates to haptic devices and more generally relates to externally-activated haptic devices and systems.

BACKGROUND

Many user devices, such as smartphones, include haptic capabilities. For example, a conventional beeper may include an eccentric-rotating mass powered by a battery that can generate vibrational effects when activated. Other types of haptic actuators may be incorporated as well. However, such actuators may be somewhat bulky, and expensive, require a power source within the device, and may require a computer processor to generate a suitable signal for actuating the actuator to provide haptic feedback to a user of the device.

SUMMARY

Various examples are described for externally-activated haptic devices and systems. One example disclosed apparatus includes a housing; and a haptic output component coupled to the housing, the haptic output component configured to be physically separable from an actuation component, and in response to receipt of an actuation signal transmitted from the actuation component while the haptic output component is physically separated from the actuation component, output a haptic effect based on the actuation signal.

One example system includes a first device comprising an actuation component; and a second device comprising a haptic output component, wherein: the first device and the second device configured to be physically separable from each other; the actuation component configured to transmit an actuation signal to the haptic output component while the first device and the second device are physically separated from each other, and the haptic output component configured to output a haptic effect in response to receiving the actuation signal and while the first device and the second device are physically separated from each other, the haptic effect based on the actuation signal.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Examples are described herein in the context of externally-activated haptic devices and systems. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Example of an Externally-Activated Haptic Device

In this example, a shopper in a store approaches a point-of-sale (POS) device to purchase a number of items she has selected while shopping. After the cashier has rung up the various items, she takes a credit card from her wallet and taps her credit card on a credit card reader that can wireless read financial information from the credit card. When the shopper taps her credit card, the credit card moves within proximity of a wireless card reader within the card reader device, and the card reader device detects the shopper's credit card and attempts to remotely obtain certain information, such as the credit card number and expiration date.

Figure 1:
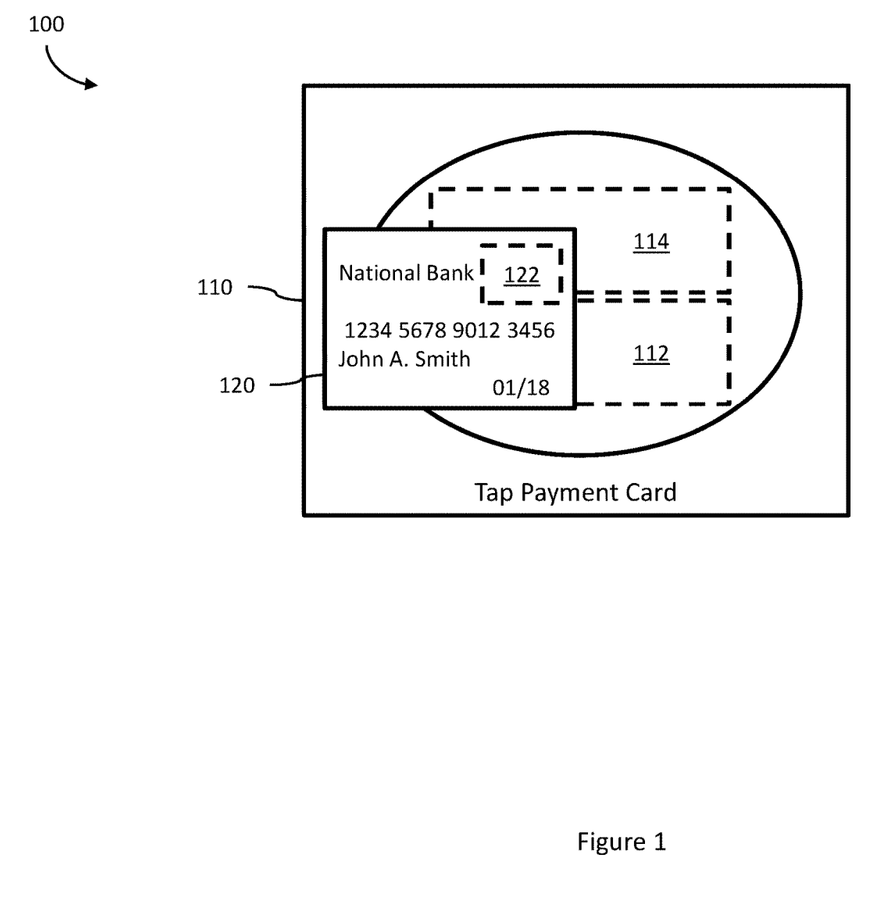
FIGS. 1-5 show example externally-activated haptic devices and systems according to this disclosure.

FIG. 1 shows an example of such system 100. The credit card reader 110 includes a wireless card 112 reader that remotely obtains financial information from the credit card 120. In this example, the shopper's credit card also includes a small piece of steel 122 embedded within the card, while the credit card reader includes an electromagnet 114. When the credit card reader 110 detects the credit card 120 is within proximity of the wireless card reader 112, the credit card reader 110 activates the electromagnet 114, which attracts the piece of steel 122 and draws the credit card 120 towards the reader, providing a haptic effect to the shopper. Thus, the shopper is informed that the credit card reader 110 has detected the credit card 120 and is attempting to read the financial information. Once the financial information has been read, the credit card reader 110 deactivates the electromagnet 114 and the shopper feels the credit card reader 110 "release" the credit card 120. If the credit card reader 110 was unable to obtain the financial information, the credit card reader 110 may instead pulse the electromagnet 114 to induce a vibration in the credit card 120 to indicate that the financial information could not be obtained.

Such an example illustrates the external actuation of a haptic output device within an object, thereby enabling haptic feedback capability in ordinary objects without the expense or impracticality of incorporating a power supply, haptic effect logic and circuitry, and a haptic output device, such as an actuator. This illustrative example is not intended to be in any way limiting, but instead is intended to provide an introduction to the subject matter of the present application. Other examples of externally-activated haptic devices are described below.

Figure 2:
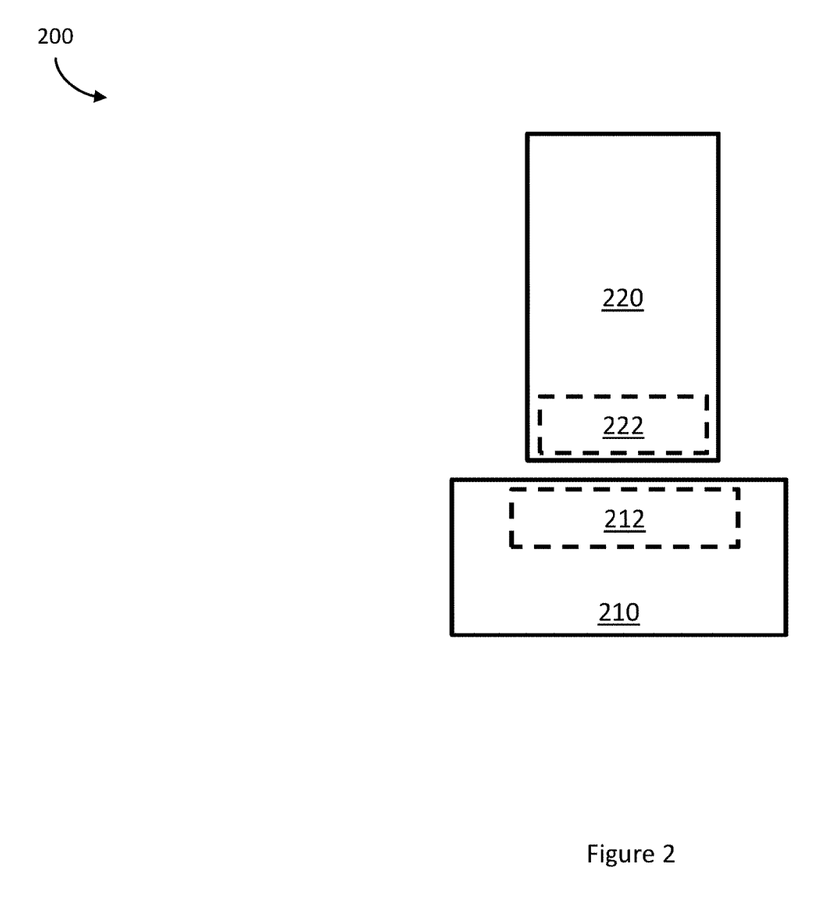

Referring now to FIG. 2, FIG. 2 shows an example externally-activated haptic device 220 and system 200. The example system 200 of FIG. 2 includes an actuation device 210 and a haptic device 220. The actuation device 210 includes an actuation component 212, while the haptic device 220 includes a haptic output device 222. As may be seen, the actuation device 210 is separate from the haptic device 220. While the two may be brought into contact, and in some examples are configured to releasably couple to each other, the haptic device 220 is configured to be separable from, or may be decoupled from, the actuation device 210. Despite such a physical separation, the actuation component 212 is configured to generate and output an actuation signal that is configured to cause the haptic output device 222 to output a haptic effect while the haptic output device 222 is physically separated from the actuation device 210.

"Physically separated" refers to a lack of physical connection between two things. For example, the haptic output device 222 is physically separated from the actuation component 210 if the two are not in physical contact with each other. Physical connection between the haptic output device 222 and the actuation component 210 would include contact created by one or more electrical wires coupling the two together. Thus, a housing of the haptic device 220 may physically contact a housing of the actuation device 210, but so long as the haptic output device 222 does not receive an actuation signal as a result of a physical connection with actuation component 212, the haptic output device 222 is physically separated from the actuation component 212. However, for example, if the haptic device 220 is in physical contact with the actuation component 210, the haptic device 220 and the actuation device 210 are not physically separated (though the haptic output device 222 and actuation component 212 may still be physically separated).

Different example actuation devices 210 may comprise one or more actuation components 212 that may be configured to output a signal for one or more types of haptic output devices 222. For example, an actuation component 212 may comprise an electromagnet that can be driven to output a constant or varying magnetic field. Such an actuation component may induce an attractive force on a haptic device 220 having a ferromagnetic material coupled to or disposed within the haptic device 220. Other example actuation components 212 include an air coil (or air core coil), an induction coil, a thermal energy source such as a resistor, an electrostatic generator, an ultrasound generator, an ultraviolet light source, or a visible light source, including a laser light source. Suitable corresponding haptic output devices 222 may comprise a permanent magnet, a metal, a ferromagnetic material, a shape-memory alloy (SMA), a bimetallic strip, a resonator tuned to vibrate in response to one or more ultrasound frequencies, or a light-sensitive tape. The following table provides some examples of actuation components 212 and corresponding haptic output devices 222:

| Example Actuation Component | Example Haptic Output Device |
| --- | --- |
| Air Coil, Voice Coil | Permanent magnet, air coil + actuator (e.g., eccentric rotating mass, piezo-electric actuator, linear resonant actuator, etc.) |
| Electromagnet | Metal strip(s), metal flake(s), metal plate(s), SMA |
| Resistor | SMA, bimetallic strip |
| Ultrasound generator | SMA |
| Ultraviolet or visible light | SMA |

The correspondences between example actuation components 212 and the example haptic output devices 222 shown in the table are intended only as examples. Other combinations of actuation components 212 and haptic output devices 222 may be used. Further, multiple haptic output devices 222 may be used in conjunction with a single actuation component 212 or multiple actuation components 212, or multiple actuation components 212 may be used in conjunction with a single haptic output device 222 or multiple haptic output devices 222. Further an actuation component 212 may be employed to output different signals to provide different types of haptic effects. For example, an air coil may be configured to generate an attractive force on a permanent magnet haptic output device or it may be configured to generate a thermal haptic effect by inductively heating a metallic haptic output device.

In some examples, the actuation component 212 may be configured to wirelessly transfer power to a haptic device to provide power to a haptic output device, such as an actuator. For example, the actuation component 212 may comprise an induction coil and a current generator or power source configured to generate an alternating electric current in the induction coil. The actuation component 212 may thus provide an alternating electric field that may be received by a power antenna within the haptic device 210 and used to power the haptic output device 222. In some such examples, a suitable haptic output device may comprise any component or collection of components that is capable of outputting one or more haptic effects. For example, a haptic output device can be one of various types including, but not limited to, an eccentric rotational mass (ERM) actuator, a linear resonant actuator (LRA), a piezoelectric actuator, a voice coil actuator, an electro-active polymer (EAP) actuator, a shape memory alloy, a pager, a DC motor, an AC motor, a moving magnet actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various examples may include a single or multiple haptic output devices and may have the same type or a combination of different types of haptic output devices.

In other embodiments, deformation of one or more components can be used to produce a haptic effect. For example, one or more haptic effects may be output to change the shape of a surface or a coefficient of friction of a surface. In an example, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some examples comprising haptic output devices 140, 190 that are capable of generating frictional or deformations, the haptic output devices 140 or 190 may be overlaid on the touch-sensitive display or otherwise coupled to the touch-sensitive display 120 such that the frictional or deformation effects may be applied to a touch-sensitive surface that is configured to be touched by a user. In some embodiments, other portions of the system may provide such forces, such as portions of the housing that may be contacted by the user or in a separate touch-sensitive input device coupled to the system. Co-pending U.S. patent application Ser. No. 13/092,484, filed Apr. 22, 2011, entitled "Systems and Methods for Providing Haptic Effects," the entirety of which is hereby incorporated by reference, describes ways that one or more haptic effects can be produced and describes various haptic output devices.

Thus in some examples, it may be possible to eliminate a power source from the haptic device, while still using any suitable haptic output device, including actuators such as ERMs or piezo-electric actuators, to provide haptic feedback. Such a solution may involve increased complexity over some of the examples discussed herein, but may still provide cost-effective haptic capability without the need for a power source.

An actuation device 210 may be configured to selectively generate and output a signal using an actuation component 212, such as one of those discussed above. The signal may comprise an electric field, an electromagnetic field, a varying electromagnetic field, thermal radiation (e.g., infrared radiation), ultraviolet light, or visible light. The signal may comprise a waveform having any of a variety of characteristics, such as a magnitude and a frequency. Further, the magnitude or the frequency may vary with time. For example, a magnitude of a static electromagnetic field may be held constant to apply a constant force to a haptic output device 222, or the magnitude of the electromagnetic field may be varied to vary the force on the haptic output device 222.

In some examples, the actuation device 210 may comprise a processor, or may be in communication with a processor, configured to output a signal to the actuation component 212 to cause the actuation component 212 to output an actuation signal. In some other examples, the actuation component 212 may continuously output a signal while it is powered.

Suitable actuation devices 210 may be any of a number of different types of objects. For example, as was discussed above with respect to FIG. 1, an actuation device 210 may comprise a credit card reader or other card reader. In some examples, an actuation device 210 may comprise a portion of a shelving unit or a scale. Other suitable actuation devices 210 may comprise a checkout scanner, such as in a self-checkout lane in a grocery store or other shopping location. For example, a shopper may use a self-checkout lane rather than a typical cashier station. As the shopper swipes items across a scanner to read a bar code, the scanner may output an actuation signal using an actuation component to trigger a haptic effect in the item the shopper is holding to indicate that the item was scanned or to indicate a scanning error. In such an example, the various items may include a small metal plate or metal flakes that may be attracted to an electromagnet in the scanner to provide a haptic effect to the item that may be felt by the shopper. Such simple components may be easily added to many items for little cost, while providing haptic capabilities in the item.

Suitable haptic devices 220 may comprise various objects, such as credit cards or other types of cards, bottles, cartons, packages, books, magazines, newspapers, electronic devices, and wearable devices.

Figure 3:
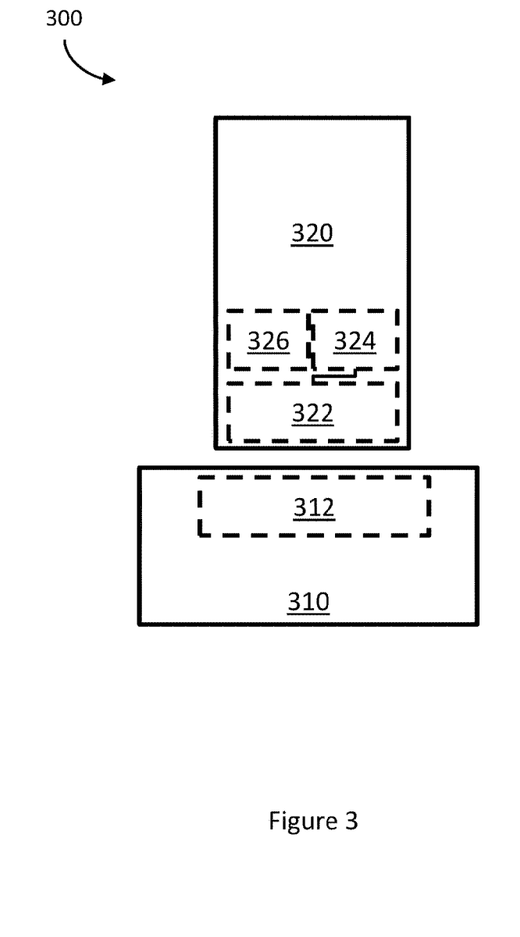

Referring now to FIG. 3, FIG. 3 shows an example system 300 including an actuation device 310 and a haptic device 320. In this example, the actuation device 310 includes an actuation component 312 configured to output an alternating electric field. The haptic device 320 includes a haptic output device 322, but also includes a power antenna 324 and an energy storage device 326. In this example, the power antenna 324 is configured to receive the alternating electric field and to provide power to the energy storage device 326 or to the haptic output device 322. In some examples, the energy storage device 326 may comprise a battery or a capacitor, or both, or multiple of one or both.

A number of suitable haptic output devices 322 were discussed above, but others may comprise actuators that may require electrical power to generate a haptic effect. Such a haptic output device 322 may be powered directly by the power antenna 324 or may draw power from the energy storage device 326 to provide a haptic effect. For example, the power antenna may charge the energy storage device 326, and once the energy storage device 326 has stored a threshold amount of energy, the energy may be released to power the haptic output device 322. And while the example haptic device 320 here includes an energy storage device 326, other examples may not, but may instead directly power the haptic output device 322 from the power antenna 324.

In some examples, the haptic output device 322 may comprise an RFID tag, which may comprise the power antenna 324, and the actuation device may comprise an RFID reader. An RFID reader may emit radio energy to power the RFID tag, which may, in response, provide information to the RFID reader. In one example, the radio energy emitted by the RFID reader may be partially diverted to power a haptic output device 326. For example, the haptic output device 322 may output a haptic effect while the RFID reader is reading information from the RFID tag, which may provide a tactile indication that the RFID tag is being read. A person holding the haptic device 320 may feel the haptic effect and maintain the position of the RFID tag to allow the RFID tag reader to obtain all of the needed information, or the haptic effect may indicate that the information has been read, and that the person may move the haptic device 320 away from the RFID reader.

Figure 4:
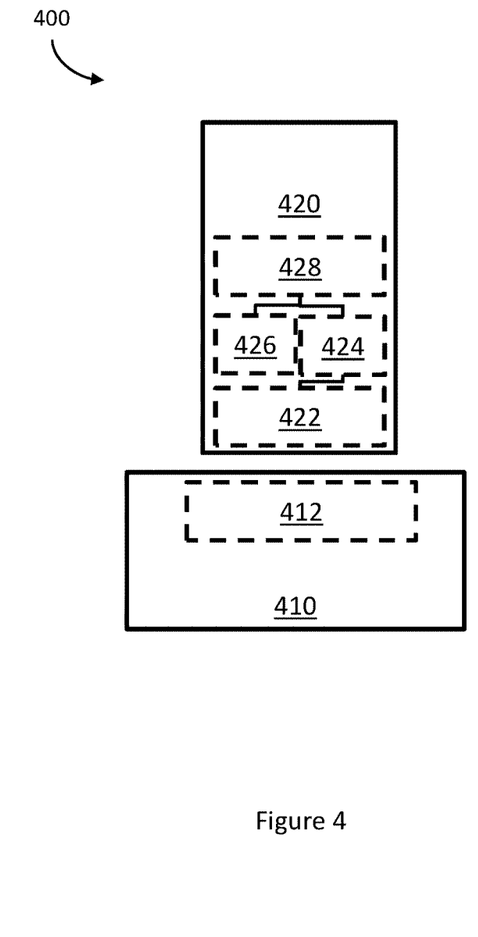

Referring now to FIG. 4, FIG. 4 shows an example system 400 including an actuation device 410 and a haptic device 420. In this example, the actuation device 410 includes an actuation component 412 configured to output an alternating electric field. The haptic device 420 includes a haptic output device 422, a power antenna 424, an energy storage device 426, and a processor 428 having instructions to provide one or more different haptic effects. Such instructions may be stored within the processor itself or via separate computer-readable media. As discussed above with respect to the example system of FIG. 4, the power antenna 424 is configured to receive the alternating electric field and to provide power to the energy storage device 426 or to the haptic output device 422. In addition, the power antenna 424 is configured to provide power to the processor 428 to enable the processor 428 to output a signal to the haptic output device 422 to cause the haptic output device 422 to output a haptic effect.

For example, the processor 428 may comprise instructions that describe a waveform of a signal to output to the haptic output device 422. Upon being powered, the processor 428 may begin transmitting a signal based on the waveform. In some examples, the processor 428 may have instructions describing a plurality of selectable haptic effects. A haptic effect may be selected by a switch or may be based on an amount of power supplied to the processor 428 by the power antenna 424. For example, a lower amount of power may cause the processor 428 to select a low frequency, low magnitude force, while a larger amount of power may cause the processor 428 to select a high frequency, high magnitude haptic effect to output. In some examples, the processor 428 may cycle through available haptic effects by providing a first haptic effect for a first period of time, followed by a second haptic effect for a second period of time, and so on, until all haptic effects have been played at which point the processor 428 may discontinue outputting haptic effects or may restart at the first haptic effect. A period of time may be determined using a simple component such as a ripple counter or other counter, or may be determined by the processor, or may correspond to a single iteration of each available haptic effect.

Figure 5:
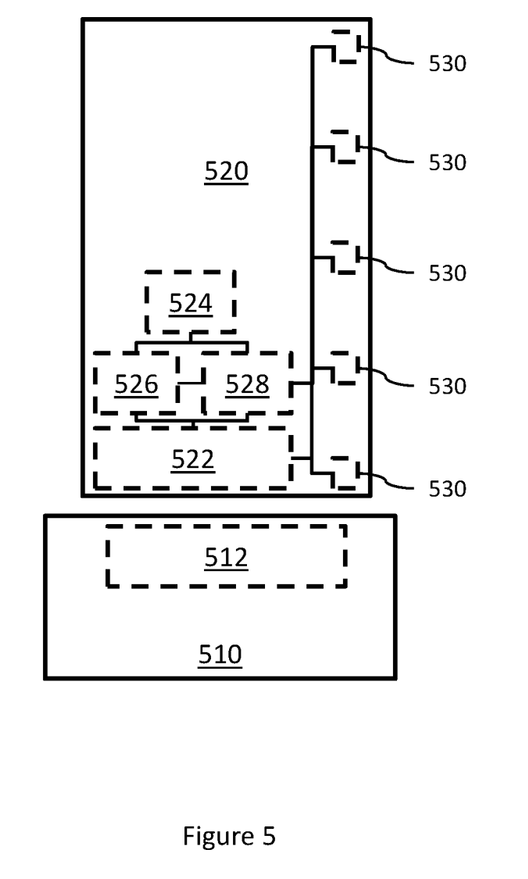

FIG. 5 shows another example system 500 including an actuation device 510 and a haptic device 520. Aspects of any of the systems of FIGS. 1-4 may be incorporated into the example system 500 shown in FIG. 5, such as one or more actuation components, haptic output devices, power antennas, energy storage devices, or processors or computer-readable media.

The haptic device 520 shown in FIG. 5 includes a haptic output device 522, a power antenna 524, an energy storage device 526, and a processor 528 having instructions to provide one or more different haptic effects. Such instructions may be stored within the processor itself or via separate computer-readable media. In addition, the haptic device 520 also includes a plurality of sensors 530. In this example, the haptic device 520 includes five sensors, however other numbers of sensors may be suitable in other examples. In this example, the sensors 530 are configured to sense a level of a fluid held within the haptic device 520.

For example, if the haptic device 520 comprises a bottle of eye drops, the sensors 530 are configured to measure a level of the eye drops within the bottle. In this example, the sensors are powered by the power antenna 524, though in some examples the sensors 530 may be powered by the energy storage device 526. When the bottle is brought within proximity of the actuation device 510, the actuation device 510 emits an electric field that is received by the power antenna 524 and provided, in part, to the sensors 530. The sensors 530 in this example are configured such that each sensor 530 completes a circuit if a fluid is in contact with the respective sensor 530, thus providing an indication of the level of the eye drops within the bottle. The sensors 530 are in communication with the processor 528 and, based on the number of sensors providing a signal (indicating fluid in contact with the sensor), the processor 528 selects a haptic effect and outputs a signal to the haptic output device 522 to cause the haptic output device 522 to output the selected haptic effect. Thus, a user may swipe the bottle over an actuation device, such as on a countertop in the bathroom with an embedded actuation device 510, and receive immediate feedback regarding how full the bottle is. Such haptic information may provide more precise information about the level of shampoo than the user's estimation of weight or by unscrewing the top from the bottle to visually inspect the contents.

While the sensors 530 in this example provide an indication of a level of fullness of a container, other types of sensors may be employed. For example, temperature sensors, such as thermocouples, may be employed to determine the temperature of a liquid (e.g., coffee) within a container, such as a pitcher or coffee mug without the need to incorporate a battery or other power source within the container.

In some examples, the sensors 530 may instead be in communication with an RFID tag and be configured to provide sensor information to the RFID tag, which the actuation device 510 may read and obtain some or all of the sensor information. For example, the RFID tag may be configured to provide information about the bottle of shampoo, and may comprise one or more configurable bits that may be set based on signals received from the sensors 530. The actuation device 510 may obtain the sensor information and modify the actuation signal based on the received sensor information. For example, the actuation device 510, as discussed above with respect to the processor 528, may select one of multiple haptic effects based on the received sensor data, such as based on a percentage fullness of the bottle. In some examples, the actuation device 510 may change a magnitude or frequency of an actuation signal to modify a haptic effect output by the haptic output device 520. In some such examples, the haptic device 520 may not comprise a processor or energy storage device. Instead, the haptic device 520 may include the power antenna 524 (such as an RFID tag), one or more sensors 530, and the haptic output device 522, and the actuation device may output a power signal, such as to read the sensor information, and an actuation signal based on the sensor information.

Figure 6:
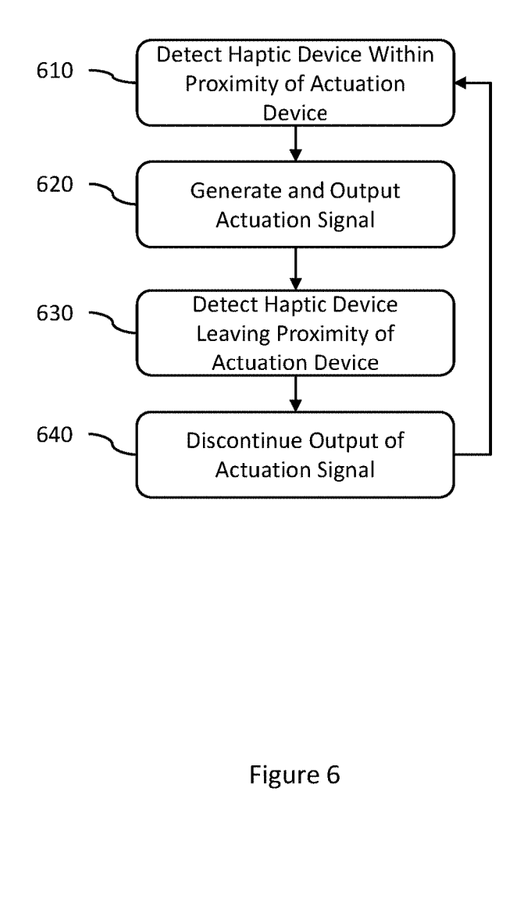
FIGS. 6-7 show examples methods for externally-activated haptic devices and systems.

Referring now to FIG. 6, FIG. 6 shows an example method 600 for an externally-activated haptic device or system. Reference will be made to the system 200 of FIG. 2, however, any suitable example system according to this disclosure may be employed, such as (but not limited to) the example systems 300-500 of FIGS. 3-5.

The method 600 begins at block 610 when the actuation device 210 detects a haptic device 220 within proximity of the actuation device 210. In this example, the actuation device 210 comprises a small metal detector configured to detect the presence of a metal within the haptic device 220, such as a metal strip or metal flakes of a haptic output device 222. In some examples, the actuation device 210 may comprise an optical scanner and be configured to detect a haptic device 220 by detecting the presence of a bar code or QR code printed on the haptic device 220 or, the actuation device 210 may comprise an RFID reader and may detect an RFID tag disposed within the haptic device 220. In some examples, the actuation device 210 may comprise a pressure sensor and may detect a haptic device 220 contacting the actuation device 210. In further examples, the actuation device 220 may comprise other suitable proximity sensors, such as ultrasound or laser sensors, or an image sensor, and may detect a proximity of a haptic device 220 based on one or more sensor signals from a proximity sensor.

At block 620, the actuation device 210, in response to detecting a haptic device 220 within proximity of the actuation device 210, generates and outputs an actuation signal. For example, as discussed above, the actuation device 210 comprises an actuation component 212 that can output a signal. Suitable examples of actuation components are discussed above, each of which may be configured to generate and output an actuation signal. In some examples, as discussed above, the actuation signal may comprise a power signal or other signal configured to cause the haptic output device 222 to output a haptic effect.

At block 630, the actuation device 210 detects that the haptic device 220 leaves a proximity of the actuation device 210. As discussed above with respect to block 610, the actuation device 210 may comprise one or more sensors and may be configured to detect a proximity of a haptic device 220 based on one or more sensor signals from one or more sensors. The actuation device 210 is also configured to detect when a haptic device 220 moves beyond a threshold range, such as three inches. In other examples, the actuation device 210 may detect the haptic device 220 leaving proximity of the actuation device based on a lack of a sensor signal indicating a haptic device 220 within proximity of the actuation device 210.

At block 640, the actuation device 210, in response to detecting the haptic device 210 leaving proximity of the actuation device 210, discontinues generating and outputting the actuation signal.

It should be noted that in some examples according to this disclosure, detection of the haptic device is not required. For example, the actuation device 210 may continuously output an actuation signal while it is powered.

Figure 7:
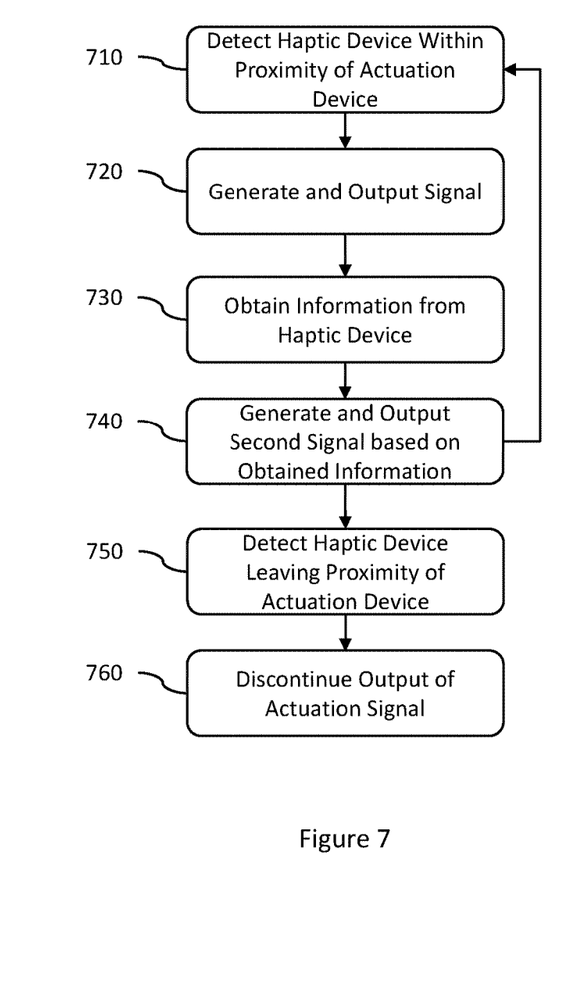

Referring now to FIG. 7, FIG. 7 shows an example method 700 for an externally-activated haptic device or system. Reference will be made to the system 200 of FIG. 2, however, any suitable example system according to this disclosure may be employed, such as (but not limited to) the example systems 300-500 of FIGS. 3-5.

The method 700 begins at block 710 when the actuation device 210 detects a haptic device 220 within proximity of the actuation device 210 as discussed above with respect to block 610 of FIG. 6.

At block 720, the actuation device 210, in response to detecting a haptic device 220 within proximity of the actuation device 210, generates and outputs a signal. For example, as discussed above, the actuation device 210 comprises an actuation component 212 that can output a signal. Suitable examples of actuation components are discussed above, each of which may be configured to generate and output an actuation signal. In one such example, the actuation device 210 may be configured generate and output RF radiation to obtain information from an RFID tag. In some examples, the output signal may comprise an actuation signal configured to cause the haptic output device 222 of the haptic device 220 to output a haptic effect.

At block 730, the actuation device 210 obtains information from the haptic device 220. In one example, the actuation device 210 comprises an RFID reader that may obtain information from an RFID tag disposed within the haptic device 220. Such information may comprise information statically encoded within the RFID tag, or in some examples, the information may comprise information dynamically modified within the RFID tag. For example, as discussed above with respect to FIG. 5, the haptic device 520 may comprise one or more sensors 530 in communication with the RFID tag. The RFID tag may be configured to alter a value of one or more bits based on signals received from the one or more sensors. The actuation device 210 may then obtain the values of the altered bits by obtaining information from the RFID tag. In some examples, the actuation device 210 may obtain information from a code, such as a bar code or QR code, printed on a surface of the haptic device 220.

At block 740, the actuation device 210 generates and outputs a second signal based on the obtained information. For example, the actuation device 210 may select a haptic effect, or modify a haptic effect, based on information received form the device. For example, the actuation device 210 may select a haptic effect based on information obtained from one or more sensors of the haptic device 220. In one example, the actuation device 210 may obtain product information from the haptic device 220, such as from a bar code or RFID tag, and determine that the product is on sale. The actuation device may then generate and output a second haptic effect, such as a high magnitude pulsed vibration, to indicate that the product is a sale item.

At block 750, the actuation device 210 detects that the haptic device 220 leaves a proximity of the actuation device 210 as discussed above with respect to block 630 of FIG. 6.

At block 760, the actuation device 210, in response to detecting the haptic device 210 leaving proximity of the actuation device 210, discontinues generating and outputting the second actuation signal.

It should be noted that in some examples according to this disclosure, detection of the haptic device is not required. For example, the actuation device 210 may continuously output an actuation signal while it is powered.

While some examples of methods and systems herein are described in terms of software executing on various machines, the methods and systems may also be implemented as specifically-configured hardware, such as field-programmable gate array (FPGA) specifically to execute the various methods. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable storage media, that may store instructions that, when executed by the processor, can cause the processor to perform the steps described herein as carried out, or assisted, by a processor. Examples of computer-readable media may include, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

That which is claimed is:

1. A method comprising:
   receiving, by a haptic device, a wireless interrogation signal from an actuation device;
   responsive to receiving the wireless interrogation signal, determining, using a sensor of the haptic device, a state of a material contained within the haptic device, the haptic device defining a container to store a quantity of material;
   transmitting an indication of the state of the material to the actuation device;
   receiving by the haptic device, a wireless actuation signal from the actuation device, the wireless actuation signal comprises electromagnetic actuation energy and an indication of a haptic effect, the indication of the haptic effect based on the state of the material; and
   responsive to receiving the wireless actuation signal, outputting the haptic effect using the electromagnetic actuation energy.

2. The method of claim 1, wherein the sensor uses received electromagnetic energy from the wireless interrogation signal to determine the state of the material.

3. The method of claim 1, wherein the haptic device comprises a haptic output component configured to:
   be physically separable from an actuation component of the actuation device and receive the wireless actuation signal, and
   in response to receipt of the wireless actuation signal and while the haptic output component is physically separated from the actuation component, output the haptic effect using electromagnetic energy from the wireless actuation signal.

4. The method of claim 1, wherein determining the state of the material comprises receiving sensor signals from a plurality of sensors, and determining the state of the material is based on the received sensor signals.

5. The method of claim 4, further comprising determining a quantity of the material based on a number of sensors from which a sensor signal is received.

6. The method of claim 1, wherein the haptic device comprises an RFID tag, and wherein transmitting the indication of the state of the material comprises transmitting an RFID signal comprising the indication of the state of the material.

7. The method of claim 1, wherein the haptic device comprises a bottle, a carton, a pitcher, or a drinking container; wherein the material is a liquid; and wherein the state of the material is a quantity of liquid.

8. The method of claim 1, wherein the haptic device comprises a bottle, a carton, a pitcher, or a drinking container; wherein the material is a liquid, and wherein the state of the material is a temperature of the liquid.

9. The method of claim 1, wherein the wireless actuation signal comprises a varying electromagnetic field.

10. The method of claim 9, wherein the haptic device comprises a haptic output component, the haptic output component comprises at least one of a magnet or a ferromagnetic material ("FM material"), and wherein the magnet or the FM material is configured to directly receive the varying electromagnetic field ("EMF") and to move in response to receipt of the varying EMF to output the haptic effect.

11. The method of claim 1, wherein the haptic device comprises an actuator, and wherein the actuator receives actuating power from a power antenna of the haptic device.

12. The method of claim 1, wherein outputting the haptic effect comprises inductively heating a haptic output device using energy from the wireless actuation signal.

13. A haptic device comprising:
   a container defining a volume to store a material;
   one or more sensors coupled to the container and configured to sense a state of the material;
   an RFID tag component to receive one or more sensor signals from the one or more sensors, receive wireless interrogation signals from an actuation device, and transmit wireless response signals to the actuation device; and
   a haptic output component configured to:
      be physically separable from an actuation component of the actuation device and receive wireless actuation signals, and
      in response to receipt of the wireless actuation signals and while the haptic output component is physically separated from the actuation component, output a haptic effect using electromagnetic energy from the wireless actuation signal.

14. The haptic device of claim 13, wherein at least one of the one or more sensors is configured to sense a level of a liquid within the container.

15. The haptic device of claim 13, wherein at least one of the one or more sensors is a temperature sensor.

16. The haptic device of claim 13, further comprising a battery in communication with the one or more sensors.

17. The haptic device of claim 13, wherein the wireless actuation signal comprises a varying electromagnetic field.

18. The haptic device of claim 17, wherein the haptic output component comprises at least one of a magnet or a ferromagnetic material ("FM material"), and wherein the magnet or the FM material is configured to directly receive the varying electromagnetic field ("EMF") and to move in response to receipt of the varying EMF to output the haptic effect.

19. The haptic device of claim 13, wherein the haptic output component comprises an actuator, and wherein the actuator is configured to receive actuating power from a power antenna of the haptic device.

20. The haptic device of claim 13, further comprising a plurality of haptic output components, at least two of the haptic output components configured to:
   be physically separable from a respective actuation component of the actuation device and receive wireless actuation signals, and
   in response to receipt of the wireless actuation signals and while the respective haptic output component is physically separated from the respective actuation component, output a haptic effect using electromagnetic energy from the wireless actuation signal.

* * * * *